United States Patent [19]
Bonde

[11] Patent Number: 5,904,027
[45] Date of Patent: *May 18, 1999

[54] FLOWPACKAGING MACHINE WITH ADJUSTABLE CLOSING JAWS

[76] Inventor: Tommy Bonde, Vestergade 45 B, 1, DK-8600 Silkeborg, Denmark

[*] Notice: This patent issued on a continued prosecution application filed under 37 CFR 1.53(d), and is subject to the twenty year patent term provisions of 35 U.S.C. 154(a)(2).

[21] Appl. No.: 08/838,227

[22] Filed: Apr. 17, 1997

[30] Foreign Application Priority Data

Apr. 17, 1996 [DK] Denmark .................................. 0447/96

[51] Int. Cl.⁶ ..................................................... B65B 51/10
[52] U.S. Cl. ...................... 53/374.3; 53/374.5; 53/374.6; 53/376.2
[58] Field of Search .......................... 53/450, 550, 374.6, 53/374.5, 376.2, 374.3, 375.4

[56] References Cited

U.S. PATENT DOCUMENTS

| | | | |
|---|---|---|---|
| 4,019,307 | 4/1977 | Ballestrazzi et al. ...................... | 53/182 |
| 4,063,400 | 12/1977 | Millevoi ...................................... | 53/77 |
| 4,299,075 | 11/1981 | Gram ....................................... | 53/374.6 |
| 4,483,126 | 11/1984 | Henry ....................................... | 53/551 |
| 4,553,377 | 11/1985 | Klinkel ..................................... | 53/548 |
| 5,471,822 | 12/1995 | Dugan et al. ........................... | 53/373.6 |
| 5,653,085 | 8/1997 | Suga ........................................ | 53/374.5 |
| 5,669,201 | 9/1997 | Simionato ............................... | 53/374.5 |

*Primary Examiner*—James F. Coan
*Assistant Examiner*—Gene L. Kim
*Attorney, Agent, or Firm*—Sixbey, Friedman, Leedom & Ferguson; David S. Safran

[57] ABSTRACT

A flowpacking machine comprising a conveyor for bringing a row of products wrapped in a string casing into a closing station, in which an upper and a lower jaw (18,20) are reciprocated in counterphase to close and cut the string casing between the products. The jaws should meet at a level corresponding to half the height (h) of the products, whereby some adjustment is required for each new product height. The disclosed machine is characteristic in that one of the jaws (20) is height adjustable mounted on the vertical rod member (34) which moves it up and down, whereby the adjustments are particularly easy to carry out. They can even be controlled automatically by a reading in of the new product height. When the rod member is a tooth rod a very safe holding of the adjustable jaw is achieved.

4 Claims, 4 Drawing Sheets

U.S. Patent    May 18, 1999    Sheet 1 of 4    5,904,027
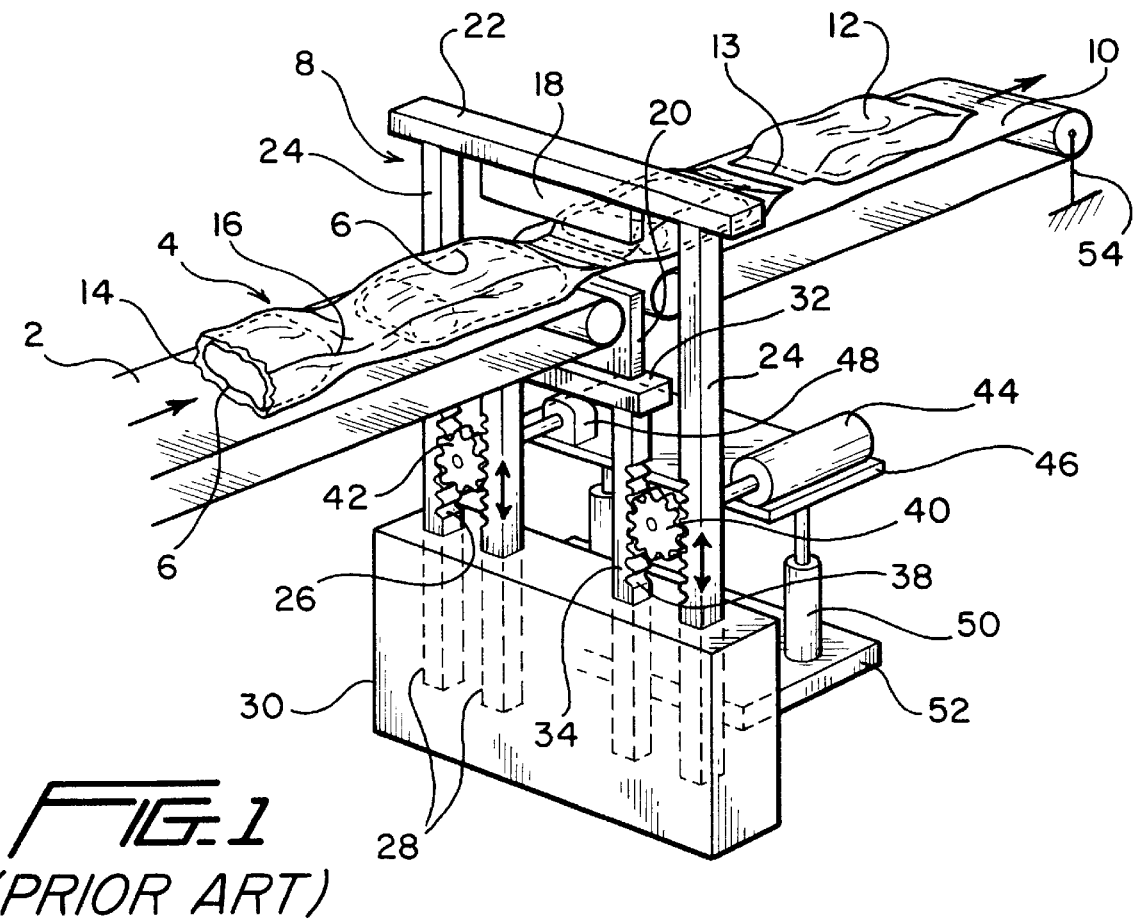
FIG. 1
(PRIOR ART)
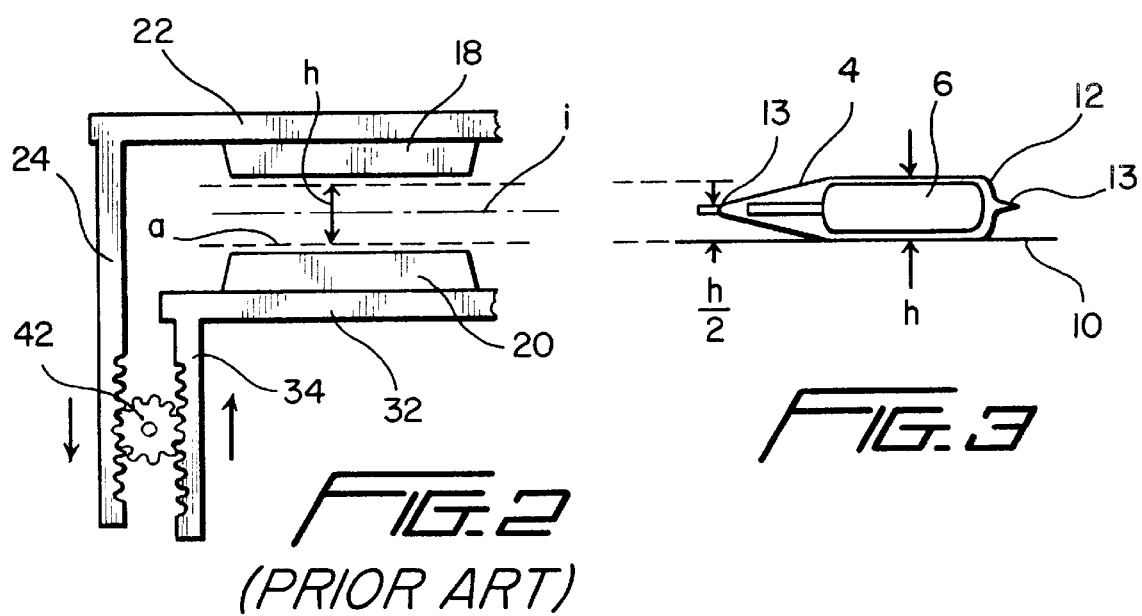
FIG. 2
(PRIOR ART)
FIG. 3

FLOWPACKAGING MACHINE WITH ADJUSTABLE CLOSING JAWS

The present invention concerns a packing machine of the flowpacking type, i.e. for individual packing of objects like ice lollies conveyed on a line and which are packed spaced apart in a tube shaped run of packing material, which continuously or intermittently is conveyed to a cross closing station, wherein a pair of parallel tool jaws are moved in vertical direction and mutually to and fro so that in the closed position they are squeezing the tube run together between two objects and by die stamping or welding shuts off the tube run at this point, while in their open position they allow the now partly enclosed object to pass forward to a position in front of the tool assembly, whereafter this is closed again and thereby closes the remaining free opening of the tube run around the object. Preferably, there is performed a cutting of the flatly closed packing run simultaneously with the transverse closing of it, whereby for each operation there is produced a freed packing of an object with a completely closed wrapping.

More specifically, the invention relates to such a packing machine in which the means for moving the tool jaws to and fro each other comprise a rotary pinion co-operating at one side with a tooth rod connected with one of the jaws and at an opposite side with another tooth rod connected with the other jaw. This is a simple and widely use arrangement which ensures a fully synchronised counter phase motion of the two jaws in response either to the pinion being rotated or to one of the jaws being driven towards and away from the opposite jaw.

By a continuous conveyance of the line of objects the tool set is furthermore to be moved to and fro for successive closing and separation of the objects, but it is without significance for the present invention whether a such continual flow is used or with an intermittent movement, by which the tool set may be stationarily placed.

Usually the tube packing run in question will be a web of paper or foil which is folded lengthwise about a row of objects laid down successively and thereafter assembled to a closed tube by lengthwise embossing or welding of the longitudinal edge joint.

By the invention attention is paid to the condition that by handling series of products with different thickness it is necessary to perform some adjusting of the apparatus to achieve that the jaws in their closed position take a position in which the compressed tube run, irrespectively of how it is produced, is situated in the vertical direction at a level close to half the height of the objects. This is necessary already due to considerations of the look of the finished packing as this will otherwise become rather misshapen.

It has been a commonly used practice that a such adjustment has been performed by a general mutual vertical adjustment between the entire tool station and the conveyor moving the object line, because in principle it is easy hereby to achieve any desired difference in the height between the line of transport and the level of squeezing of the tool jaws. This, however, implies a considerable complication of the whole apparatus and/or arduous work with the adjustments in question.

Also another kind of adjustment is desirable, viz. With respect to the degree of opening between the tool jaws. This opening, of course, should be sufficient to enable the products to pass through the gap between the opened jaws, but in case of thin products there is no need to open the jaws as widely as required for the passage of products of maximum thickness; such an excess opening would incur unnecessary wear and energy consumption.

U.S. Pat. No. 4,553,377 discloses a system of the discussed type, in which both kinds of adjustments can be effective. A rotary cam operates the lower jaw through an adjustable lever system, such that the jaw will always depart from a fixed lower level slightly below the level of the conveyor and be raised therefrom with an adjustable stroke length. The upper jaw or rather a carrier therefor will then be moved correspondingly downwardly. The upper jaw is height adjustably mounted on its carrier, and in order for the jaws to meet at the desired medium level it is required to adjust the upper jaw to different height positions on the carrier for different stroke lengths. This adjustment is effected by means of screw spindles, and it has to be done with utmost care, as a correct meeting and parallellity of the jaws is crucial. On the other hand, it is then possible to adjust the jaws to any desired meeting level.

In connection with the invention it has been realized that the height adjustment of the jaws can be greatly facilitated if it is acceptable to make use of a stepwise adjustment, this being acceptable in most cases, if the steps are relatively small. According to the invention, on this basis it is relevant to consider an integrated "Source of increments", viz. the tooth rods. The jaw carriers or only one of them may be connected to the associated tooth rod in a slidable manner along an extended toothed portion of the rod and be arrestable to the rod by holding means releasably engaging the teeth. With such an arrangement a shift of position is very easy to carry out, and it will be ensured automatically that there is provided a very firm grip of the jaw carrier seen in the axial direction of the tooth rod, this being the critical direction with respect to the transfer of forces in the moved system.

In connection with the invention, the shift to another product height can be effected without the requirement of any complicated mechanism for moving the lower jaw from a lower reference position, inasfar as the jaw, being released from its tooth rod, can simply be held in that position while the pinion is rotated so as to bring the upper jaw into its new operative opening height and to displace also the lower tooth rod correspondingly; then the lower jaw is reanchored to its tooth rod, and when the pinion is then rotated to bring the jaws together, then they will automatically meet in a level approximately midways of the new product height. Also, the jaws will automatically remain parallel to each other, as they are steadily guided by the main guiding means of the machine.

For the driving of the reciprocating system it is preferred to make use of a reversible step motor driving the pinion one way and the other, thus in a controllable manner displacing the tooth rods and the jaws with the correct stroke lenghts. According to the invention it is possible to combine this type of control with a system for adjusting the jaw positions fully automatically, based e.g. by a reading in of the new product height. The said disengagement between the jaw carrier and its tooth rod can be effected automatically, whereafter the tooth rod is displaced as many increments as required, controlled by the step motor, and the jaw carrier is reanchored to the tooth rod.

The invention will be explained in more detail hereinafter with reference to the drawing, on which:

FIGS. 1 and 2 are illustrations of of prior art machinery, while

FIG. 3 is a sectional view of a finished packing,

Figure 4:
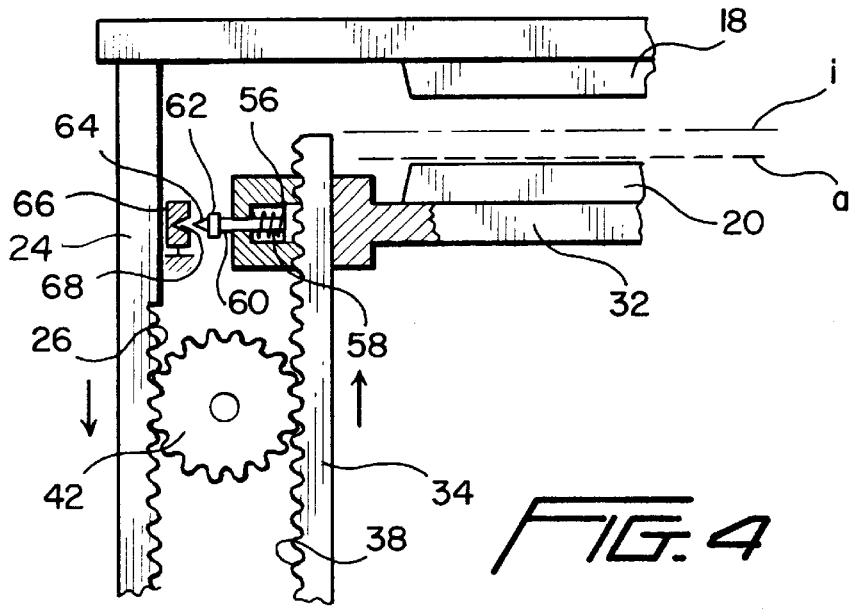
FIG. 4 is an illustration a device modified according to the invention and corresponding to FIG. 2.

The system shown in FIG. 1 comprises a feeding conveyor 2 for bringing a string 4 of flow packed products 6 to a cross closing and separation station a and an outlet conveyor 10 for bringing the closed and separated packings 12 away from the station S. The string 4 consists of a tubular web of paper or other packaging sheet material 14 housing the products 6 with these located with some mutual axial spacing, and normally exhibiting a sealed length seam 16. The purpose of the closing station 8 is to effect a cross closing of the web 14 between the individual products 6 and to cross cut the string at these closing areas so as to deliver singular and fully closed packings 12 to the outlet conveyor 10.

The main parts of the station 8 are two opposed closing jaws 18 and 20 located above and beneath the level of the string 4, respectively. The upper jaw 18 is mounted on a jaw carrier beam 22 supported by opposite posts 24 which have inner toothings 26 and are vertically slidably held by suitable guiding means, e.g. by guiding channels 28 in a stationary guide block 30. In a similar manner, the lower jaw 20 has a carrier beam 32 supported by slide posts 34, arranged between the posts 24, spaced therefrom and provided with exterior toothings 38. Also, the posts 34 are vertically displaceable, guided e.g. in channels 28 of the block 30.

The interfacing toothings 26 and 38 of the opposed pairs of posts 24 and 34 are, for each pair, in engagement with an interposed pinion 40 and 42, respectively. The pinion 40 is drivingly shaft connected with a step motor 44 on a mounting platform 46, while the pinion 42 is shaft connected with a bearing system 48 on the same platform serving to stabilize the pinion 42 in the same level as that of the pinion 40. The platform 46, in its turn, is carried in a height adjustable manner, e.g. supported by spindle or cylinder means 50 on a stationary plate member $5^2$. As indicated at 54 it is supposed that the conveyors 4 and 10 be supported in a stationary level.

When the pinion 40 is rotated clockwise it will serve to move the post 24 downwardly and the post 34 upwardly, whereby the jaws 18 and 20 are moved together to perform their closing and cutting operation. The pinion 42 serves to passively duplicate these movements in order to counteract edging of the moved posts in the channels 28 and thus ensure that the jaws 18 and 20 will remain parallel. When the pinion 40 is then rotated the opposite way the jaws are brought away from each other; this rotation should continue until the jaws are interspaced sufficiently to allow for the passage of the following products 6 between them.

This leads to a consideration of FIG. 2, in which the level of the conveyors 2 and 10 is marked by a dotted line a, while the height of the products is indicated by an arrow h. The jaws 18 and 20 are spaced sufficiently to allow the products to pass between them. When the jaws are moved together they will meet at an intermediate level i representing half the height if the products, where they will produce closed end portions 13 of the wrapping material.

Graphically, the length sectional view of FIG. 3 is placed so as to correspond with the level markings of FIG. 2, showing the height dimensions h and h/2 as well as the closed end portions 13 at their desired levels of h/2. It is readily understood that in case of thinner or thicker products it will be required to adjust the height position of the conveyor level a relatively to the level of the pinions 40,42 in order to ensure that the closing level i will amount to the half of the product height h.

According to the present invention as exemplified by FIG. 4, one of the tooth rods 24,34, here the rod 34, is connected with its associated jaw carrier 32 in a releasable and thus height adjustable manner, e.g. as illustrated by the use of a wedge member 56 biased by a spring 58 towards the toothing 38 of this rod, whether or not the toothing in this engagement area has the same pitch as the toothings co-operating with the pinions 40 and 42. The wedge 56, which may comprise more than one tooth, has an outwardly projecting rod 60 with a gripping head 62 and an outermost projection 64 for co-operation with a stationary holding member 66 having a receiver aperture 68 for the projection 64.

One way of adjusting the system to a new package height will be to first bring one of the jaws 18,20 to the level i, which is h/2 above the conveying level, either by turning the pinion 42 or by displacing the lower jaw 20 along the rod 34, with the wedge 56 disengaged from the rod 34 and without requiring the fixed holding member 66, and then bring the other jaw to the same level in a corresponding manner and reengaging the wedge member 56 with the rod 34. The drive system of the pinion 42 or 44 can then be operated to move the jaws between these meeting positions and symmetrically opposed opened positions just suitable for the passage of the products.

Another and preferred manner of adjusting the jaws is to make us of the holding member 66, which is placed in such a level that when co-operating with the rod projection 64 it will hold the lower jaw carrier 32 in a level, wherein the free jaw edge is located slightly beneath the conveyor level a, as in FIG. 4. Thus, when the pinion 42 is rotated to bring the jaw into this position and the gripping head 62 is then influenced to disengage the wedge member 56 from the rod 34 and to correspondingly engage the projection 64 with the aperture 68 of the fixed member 66, the lower jaw will automatically be retained in that particular position. The pinion 42 can then be rotated so as to bring the upper jaw into a position slightly above the top side of the new products without displacing the lower jaw, and thereafter the wedge 56 can be reactuated to engage the rod 34, whereby at the same time the projection 64 will leave the aperture 68 and again make the lower freely movable up and down in its new position on the rod 34. It will hereby be ensured that the jaws will meet each other approximately at the i- or h/2 level when the pinion 42 is rotated so as to bring the jaws together.

It should be mentioned that it is possible to automatize the above adjustment by the use of means for controlling the pinion drive motor to align the lower jaw with the holding member 66, means operable to effect the locking of the law to that member and releasing the jaw from the rod 34, means for controlling the drive motor to raise or lower the upper jaw to a level slightly above the new product height, upon a reading in thereof, and finally reactivating the operative engagement between the lower jaw and the rod 34.

As mentioned, the toothing with which the adjustable jaw co-operates, should not necessarily be a continuation of the toothing co-operation with the pinion 42 (or 44), and it would not even have to be located at the same side of the rod. Also, it could be replaced by other engagement means such as throughholes for cooperation with one or more pins.

Figure 5:
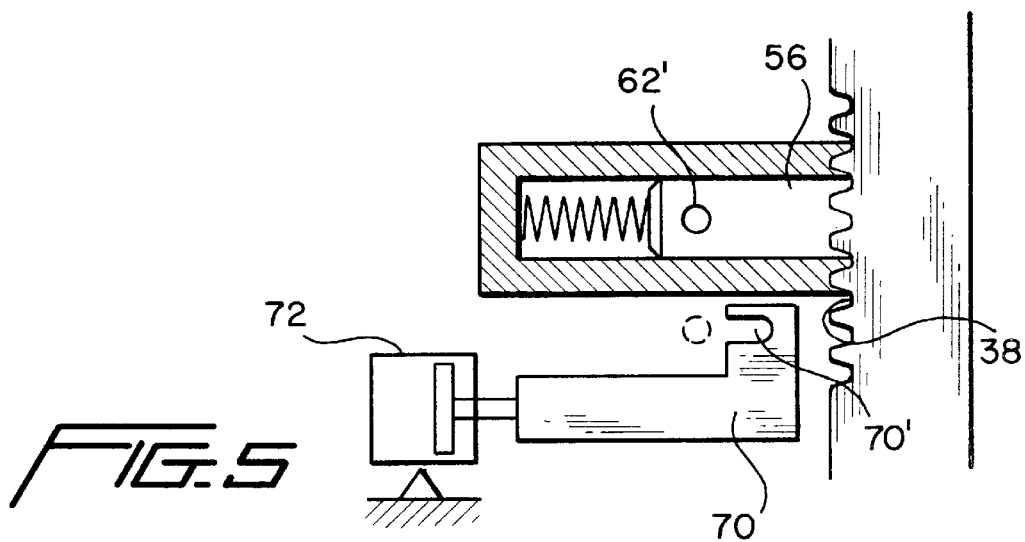
FIG. 5 is a detailed view of a modification of FIG. 4.

A preferred holding and releasing mechanism is illustrated in FIG. 5. The wedge member 56 is provided with a lateral projection 62' for co-operation with a hook member 70 carried by a stationary cylinder 72. In the said bottom position of the jaw 20 the projection 62' is located next to the hook incision 70', whereby the wedge member 56 is retractable from the toothing 38 by actuation of the cylinder 72, whereafter the jaw is held in the required level during the following adjustment.

Figure 6:
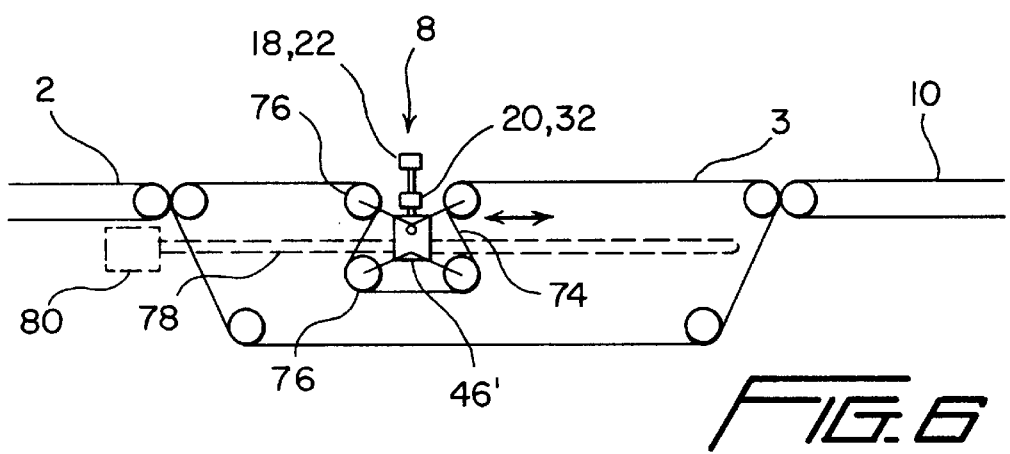
FIG. 6 is a schematic side view of a modified machine.

As mentioned, it is already known in practice that the entire closing station can be reciprocated along the conveying path of the products to be packaged, such a system being schematically shown in FIG. 6. Between the conveyors 2 and 10 there is arranged a further conveyor 3. The upper run of which passes through a loop 74 formed or held by four rollers 76 associated with a cross beam 46¹, which—structurally—corresponds to the platform 46 of FIG. 1, this beam serving as a carrier for the entire closing station and, itself, being lengthwise slidably supported by guide means 78. In this manner the entire closing station can be reciprocated, driven by any suitable driving means, along the guide means 78, whereby the row of products to be packed can be moved continiously.

According to the invention and as disclosed in more detail in a copending international patent application, it is possibel to make use of the guide means 78 for rotating the driving pinions 40,42 in a controlled manner with the use of a step motor (servomotor 80), viz. In using for the guide means two rotary driving shafts with serve to drive a sleeve member in the station 8 for rotating the pinion 42 while the station is slidable along the shafts.

Figure 7:
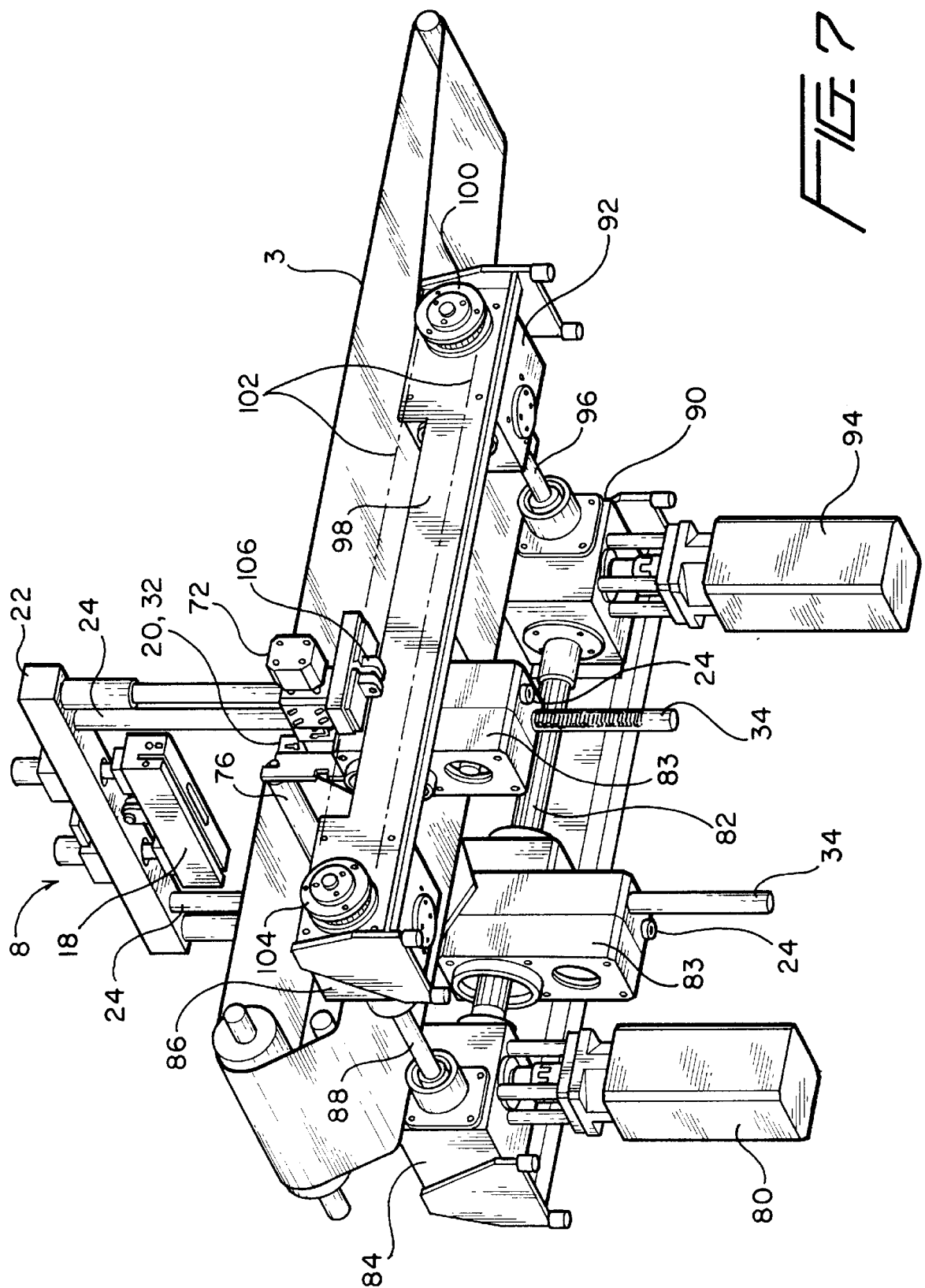
FIGS. 7 and 8 are perspective views of a machine according to the invention, seen from below and above, respectively.
Figure 8:
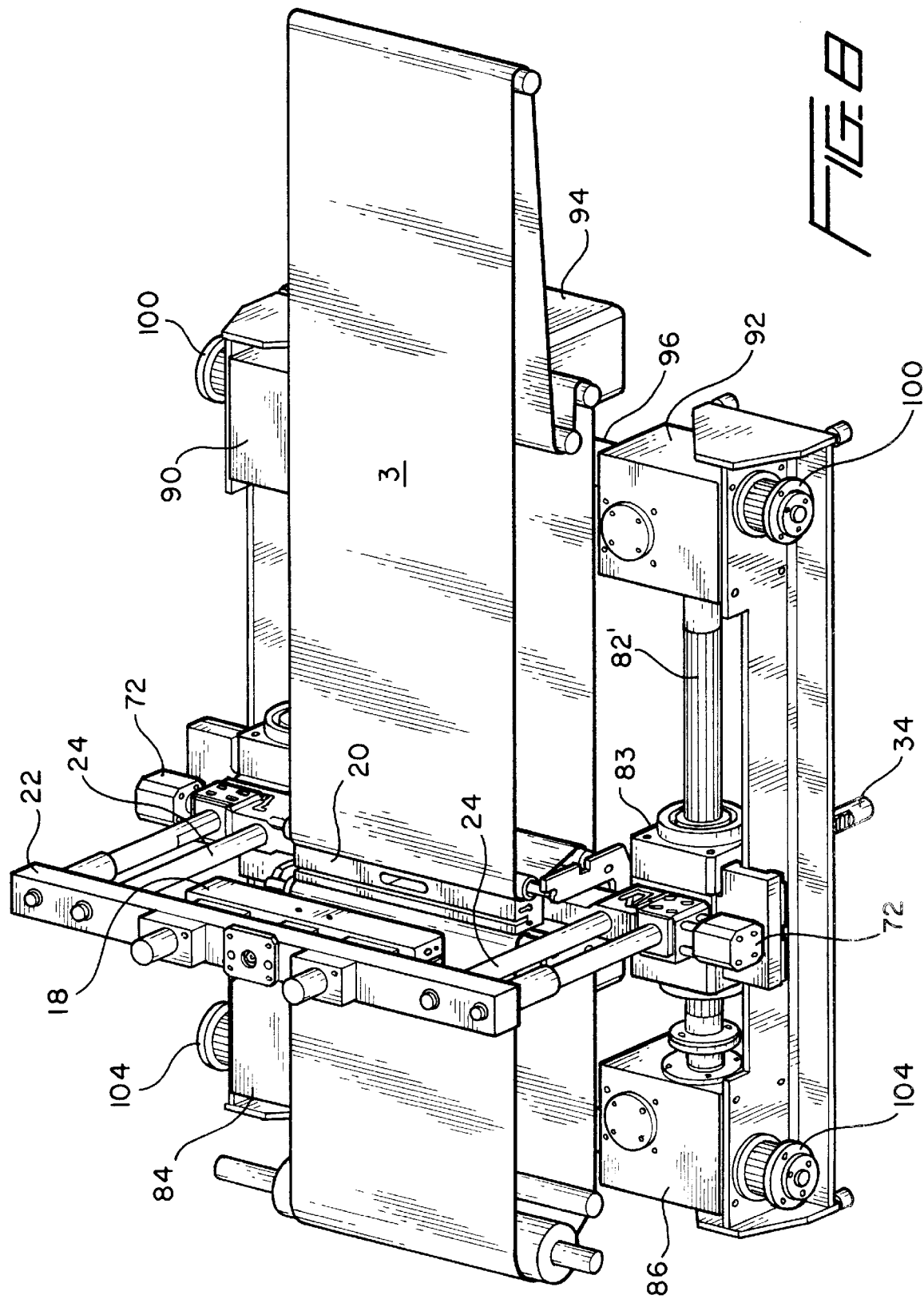

This is further illustrated by the machine shown in FIGS. 7 and 8. The two combined guiding and driving shafts are designated 82 and 82¹. They cooperate with respective guide blocks 84 of the station 8 in which the grooved shafts are in driving connection, directly or indirectly, with the respective, interior pinions 40 and 42 (FIG. 1). The shaft 82 is driven from the motor 80 through a gear box 84, which is also drivingly connected with an opposite gear box 86 by means of a transverse shaft 88 serving to synchronously rotate the opposite driving shaft 82¹.

At their opposite ends the shafts 82 and 82¹ are mounted in bearing boxes 90 and 92, respectively, of which the box 90 also serves as a gear box for a motor 94 driving a transverse shaft 96. This shaft projects out of the side beds 98 of the machine, the projecting ends being provided with pulleys 100 for respective chains or tooth belts 102, indicated by dot-and dash lines, extending along the respective sides of the machine held by opposed idler pulleys 104. The upper run is connected to the station 8 at 106, such that the motor 94 will be operable to reciprocate the station 8 as required. The lower run of the belts 102 may serve to drive a counterweight. The cylinders 72 (FIG. 5) are identified in these two figures.

I claim:

1. A flowpacking machine comprising a conveyor for advancing a string of objects housed spaced from each other inside a tubular casing and a closing station for successively closing the tubular casing between the interspaced objects, said closing station comprising opposed jaw members arranged so as to be movable against and away from each other for enabling, respectively, a transverse closing of said tubular casing and a passage of the objects between the jaws in their opened positions, said jaws being moved by way of rotation of a pinion which, by co-operation with opposed tooth rods which are connected with the respective jaws via a carrier support, causes the displacement of the jaws towards and away from each other, characterized in that at least one of the jaws is fixedly connected with its associated carrier support and its associated carrier support is connected to its associated tooth rod so as to be adjustably engageable therewith at various points along the length of the tooth rod in order to adapt the machine to operate with objects of different thicknesses.

2. A machine according to claim 1, wherein the objects are conveyed substantially horizontally on a stationarily located conveyor, characterized in that the carrier support for the lower jaw is provided with releasable holding means for holding the for holding the carrier support for the lower jaw in engagement with the associated tooth rod at any of said various points therealong, said carrier support being disengaged from the associated tooth rod upon releasing of the releasable holding means, and actuator and support means arranged on a fixed chassis of the machine for releasing said releasable holding means in a bottom position in which the associated jaw is located slightly below the conveyor, for supporting the carrier support when it is disengaged from its engagement with its associated tooth rod and for re-engaging said releasable holding means with its associated toothed rod.

3. A machine according to claim 1, in which the engagement between the carrier support and the tooth rod is effected by way of engagement with a toothed length of the tooth rod.

4. A machine according to claim 2 and comprising adjustment means for readjusting the jaws to suit a specific product height in response to this height being read into a control unit, said control unit serving to rotate the pinion until the lower jaw assumes said bottom position, actuate said actuator and support means, rotate the pinion until the upper jaw assumes its required new opening height, and de-actuate the actuator and support means.

\* \* \* \* \*